Jan. 5, 1965 R. L. MAIER 3,163,995
VEHICLE AIR CONDITIONER CONDENSER
Filed July 17, 1962 3 Sheets-Sheet 1

Ronald L. Maier
INVENTOR.

Ronald L. Maier
INVENTOR.

Jan. 5, 1965 R. L. MAIER 3,163,995
VEHICLE AIR CONDITIONER CONDENSER
Filed July 17, 1962 3 Sheets-Sheet 3

Ronald L. Maier
INVENTOR.

United States Patent Office 3,163,995
Patented Jan. 5, 1965

3,163,995
VEHICLE AIR CONDITIONER CONDENSER
Ronald L. Maier, Oklahoma City, Okla., assignor to Fleet-Air Manufacturing, Inc., Oklahoma City, Okla., a corporation of Oklahoma
Filed July 17, 1962, Ser. No. 210,420
8 Claims. (Cl. 62—241)

The present invention relates to vehicle mounted heat exchange equipment and more particularly, to a refrigerant condensing unit arrangement for a vehicle air conditioning system.

A primary object of the present invention is to provide a new and useful condenser arrangement for heat exchange equipment such as air conditioning apparatus associated with automotive vehicles including for example truck cabs, taxicabs, limousines, etc.

Another object of the present invention is to provide a vehicle air conditioning condenser unit separately mounted in externally exposed relation on the vehicle structure such as the roof of a vehicle cab for more efficient heat removal.

An additional object of the present invention is to provide a condensing unit for a vehicle air conditioner operative to cool refrigerant conducted through a pair of interconnected coil assemblies by the ram flow principle when the vehicle is moving at a speed above a predetermined value and by a forced air-flow principle when the vehicle is moving at a relatively low speed.

In accordance with the foregoing objects, the refrigerant condensing unit of the present invention is housed within an enclosure mounted on top of the roof of the vehicle structure or at any other suitable location wherein the unit is exposed to the free flow of air. The enclosure is thereby effective to conduct a flow of air through a pair of spaced interconnected refrigerant conducting coil assemblies. When the vehicle movement is above a predetermined value, both coil assemblies may be sequentially exposed to the relatively rapid flow of air for removal of heat. When however, the vehicle speed is at a relatively low value, insufficient to remove heat from both coil assemblies, a pair of fans induce flow through each of the coil assemblies independently of each other discharging the air in a generally upward direction. In this manner, more efficient cooling of the refrigerant is effected at all vehicle speeds.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
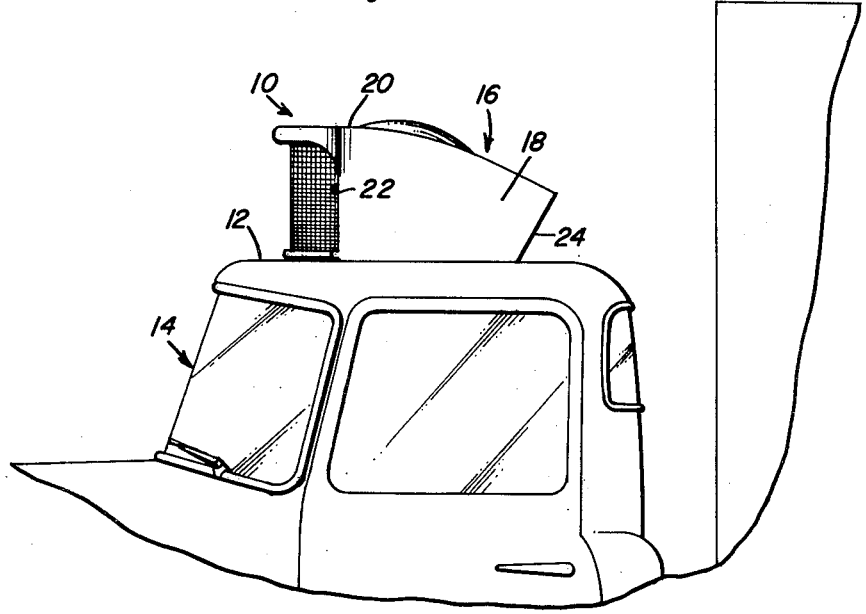
FIGURE 1 is a partial side elevational view of an automotive vehicle with the condenser unit of the present invention mounted thereon.
Figure 2:
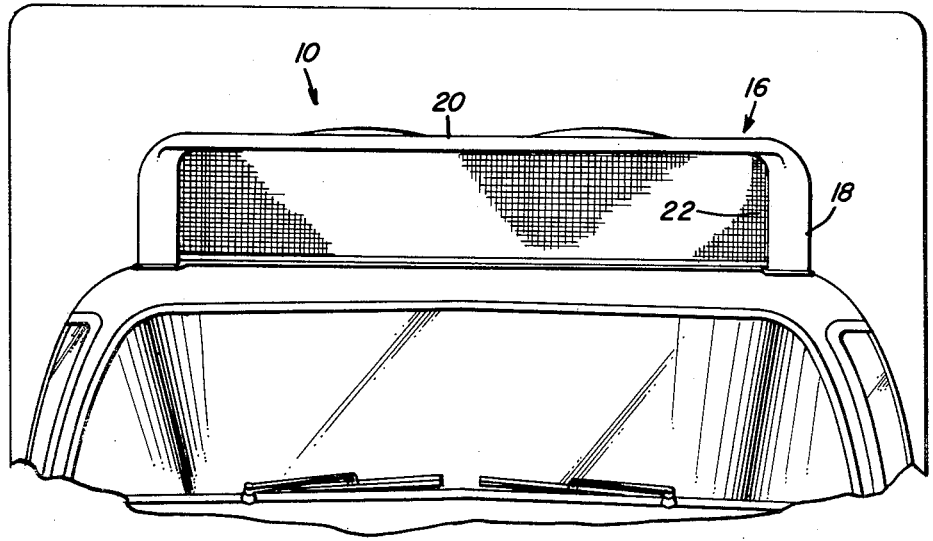
FIGURE 2 is a front elevational view of the vehicle mounted condensing unit illustrated in FIGURE 1.
Figure 3:
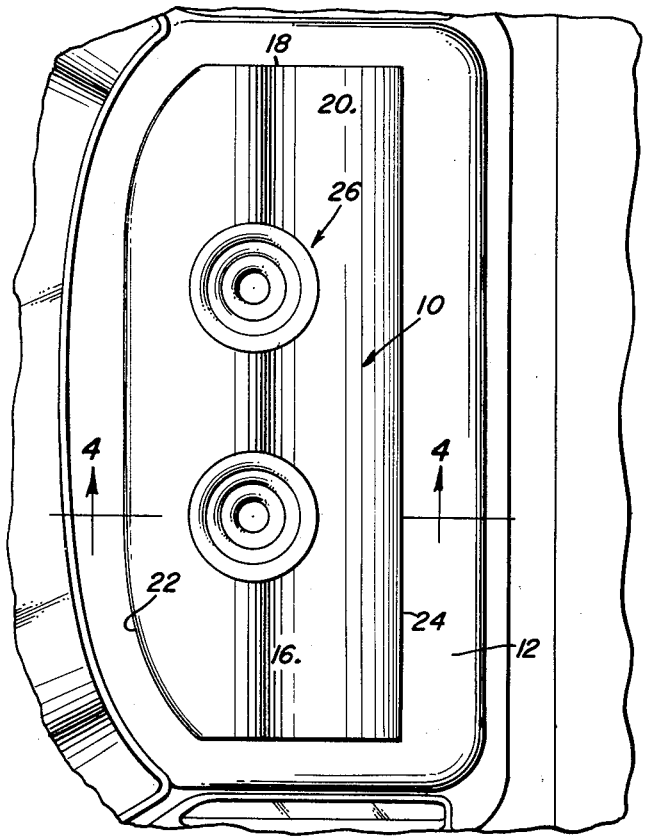
FIGURE 3 is a top plan view of the vehicle mounted condensing unit illustrated in FIGURES 1 and 2.

Referring now to the drawings in detail, it will be observed that the refrigerant condensing unit generally referred to by reference numeral 10, is shown mounted on the roof portion 12 of a truck vehicle cab 14 constituting a space enclosing vehicle structure with respect to which an air conditioning system is operative, the air conditioning system including the condensing unit 10 as an operative component thereof. As more clearly seen in FIGURES 1, 2 and 3, the condensing unit 10 is enclosed within a housing generally referred to by reference numeral 16. The housing 16 includes a pair of parallel side wall portions 18 which are interconnected by a top wall portion 20 to define a front opening 22 which extends in a lateral direction across the roof 12 of the cab and is arcuate in shape adjacent the lateral end portions of the opening. Also defined between the side wall portions 18 and the top wall 20, is a rear opening 24 which is disposed at a downwardly facing angle. Mounted on the top wall 20 of the housing 16, are a pair of spaced flow directing discharge outlets 26. As seen in FIGURE 1, the side walls 18 are imperforate. Airflow may therefore proceed through the housing between the front opening 22 and the rear opening 24 in response to vehicle movement or alternatively, forced airflow may proceed into both the front opening 22 and the rear opening 24 in an opposite direction for discharge through the outlet devices 26.

Figure 4:
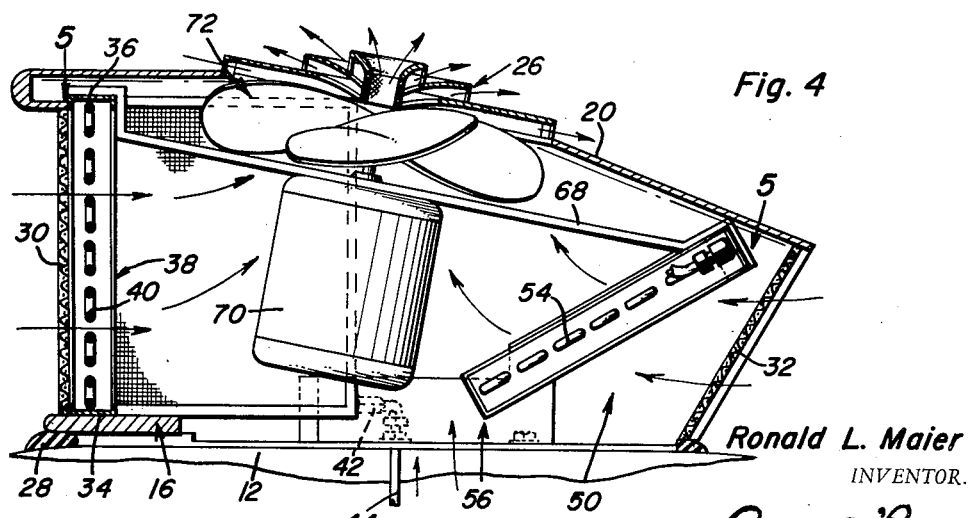
FIGURE 4 is a transverse sectional view taken substantially through a plane indicated by section line 4—4 in FIGURE 3.

Referring now to FIGURE 4 in particular, it will be observed that the housing 16 is mounted on the roof 12 of the cab in sealed relation thereto by being seated on a sealing strip 28. The front opening 22 mounts a front screen member 30 which would not obstruct the flow of air thereinto but will prevent entry of large foreign particles. Similarly, the rear opening 24 mounts a rear screen member 32. Mounted just behind the front screen member 30, between lower and upper channel frame members 34 and 36, is a front coil section generally referred to by reference numeral 38 consisting of a continuous refrigerant conducting coil 40 presenting a plurality of heat transfer surfaces exposed to the flow of air in a plane perpendicular to the direction of vehicle movement. As more clearly seen in FIGURES 4 and 5, one end of the coil 40 of the front coil section 38, is provided with an inlet fitting 42 adapted to connect the coil to the compressor of the air conditioning system by means of the conduit 44. Accordingly, heat laden, pressurized refrigerant is supplied to the front coil section 38 so that the flow of air therethrough may effect cooling of the refrigerant and partial condensation thereof. The front coil section 38 is therefore provided with an outlet fitting 46 disposed at an end opposite the inlet fitting 42 as more clearly seen in FIGURE 5 so that the refrigerant may be conducted from the front coil section by means of the connecting conduit 48 into the rear coil section 50 through the inlet fitting 52.

Figure 5:
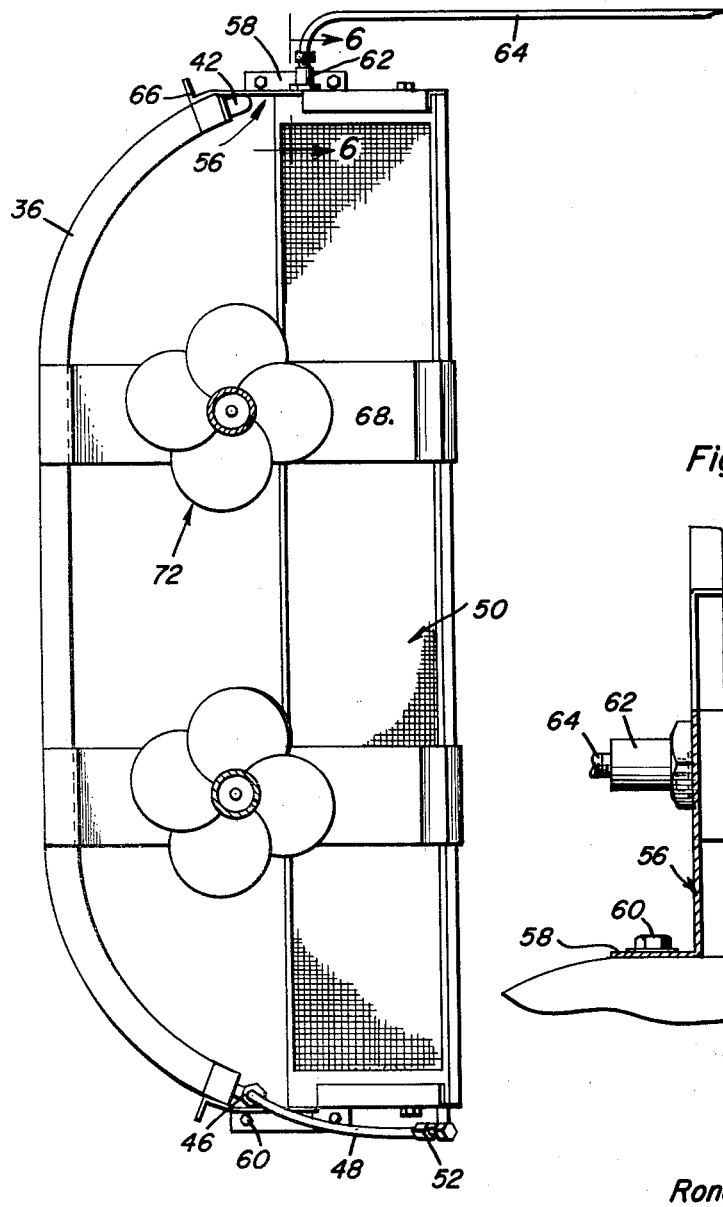
FIGURE 5 is a partial sectional view taken substantially through a plane indicated by section line 5—5 in FIGURE 4.
Figure 6:
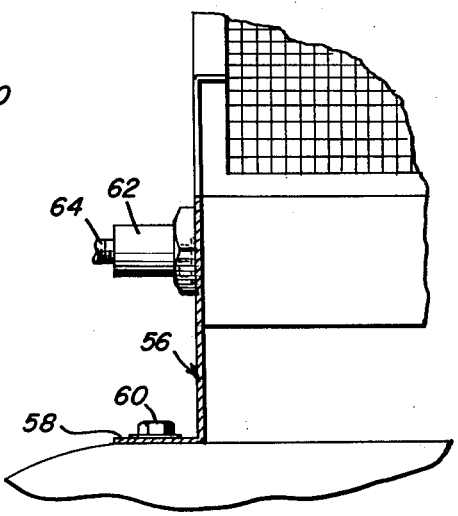
FIGURE 6 is a partial sectional view taken substantially through a plane indicated by section line 6—6 in FIGURE 5.

The rear coil section 50 is disposed at an inclined angle with respect to the front coil section as more clearly seen in FIGURE 4 so that the coil 54 thereof, will be in reduced surface exposure to the flow of air which either enters the rear opening or discharges from the rear opening depending upon the vehicle speed as will hereafter be explained. The rear coil section 50 is mounted in its inclined position by means of a pair of end plate bracket members 56 as seen in FIGURES 4, 5 and 6. The end plate bracket members 56 disposed on opposite sides of the rear coil section 50, include lower mounting flange portions 58 by means of which the rear coil section is fixedly mounted on the vehicle roof structure 12 by means of the fasteners 60. One end of the rear coil 54 opposite the inlet fitting 52, is therefore provided with an outlet fitting 62 which extends through one of the end bracket plate members 56 as more clearly seen in FIGURE 5 by means of which the condensed refrigerant is supplied by the conduit 64 to the evaporator component of the air conditioning system. The forward end portions 66 of the bracket plate members 56 are connected to the upper and lower channel frame members 34 and 36 adjacent the terminal ends thereof so as to form an interconnected assembly between the front and rear coil sections 38 and 50. The front and rear coil sections may thereby be housed within the housing 16 so as to restrictively confine the flow of air through the housing openings for passage through the coil sections.

Supported on and interconnecting the upper end portions of the front and rear coil sections, are a pair of motor mounting support members 68 as more clearly seen in FIGURES 4 and 5. The motor support members 68 thereby support in suspended relation therebelow, a pair of electric motors 70 arranged to provide powered rotation for flow inducing fan blades 72 connected to the motor shafts and aligned below the outlet devices 26 for discharge of air in a generally upward direction.

From the foregoing description, operation and utility of the condensing unit arrangement of the present invention will be apparent. It will therefore be appreciated, that when the speed of the vehicle is sufficiently high, the rapid unidirectional flow of air will be sufficient to remove heat from both the front coil section and the rear coil section as the air moves completely through the housing 16. However, at low vehicle speeds, the airflow rate would not be sufficient to provide cooling for both the front and rear coil sections since there will be a reduced rate of heat transfer at low airflow speeds. Accordingly, under such low speed conditions of the vehicle, it will be necessary to induce a forced flow through each of the coil sections independently of each other since the air must carry a greater amount of heat in view of its lower rate of movement. The powered operation of the fan blades 72 under such low speed conditions of the vehicle, will therefore induce such independent flow of air in opposite directional senses through the front and rear coil sections by discharging air in a generally upward direction between the coil sections. Inasmuch as the front coil section 38 will always involve heat transfer at a greater rate under both high and low vehicle speeds, it is disposed substantially perpendicular to the direction of vehicle movement for more complete surface exposure to the flow of air. At high vehicle speeds, air at an initially low temperature will flow through the front coil section at a high rate flow and a more rapid heat transfer rate occurs in view of the maximum temperature differential between the inflowing air and the refrigerant flowing through the coils 40 of the front coil section. The air being elevated in temperature by virtue thereof, will sequentially pass through the rear coil section at the high rate of flow removing heat therefrom at a lower heat transfer rate in view of the reduced temperature differential because of the elevation of the air temperature after passing through the front coil section. However, as hereinbefore indicated, the flow rate of the air is sufficient so that heat transfer does occur through the rear coil section. Under low vehicle speeds, effective cooling of the rear coil section would not occur because of the air flow induced by vehicle movement, for which reason the forced airflow produced by the powered fan blade assemblies 72 is relied upon to produce a fresh flow of air at a lower temperature through the rear coil section. This will also augment the flow rate of air entering the front coil section. It will therefore be noted that the inclination of the rear coil section 50 reduces the airflow area therethrough so as to increase the flow rate in view of the reduced heat transfer rate of the rear coil section when compared to that of the front coil section. Thus, the structural arrangement hereinbefore described constitutes purposeful and advantageous attributes.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In an air conditioning system for an automotive vehicle having a space enclosing structure externally exposed to the free flow of air in response to movement of the vehicle, a refrigerant condensing unit arrangement on said structure for exposure to the air comprising, housing means mounted in sealed relation on said structure having front and rear openings through which a rapid flow of air is conducted in one direction in response to movement of said vehicle above a predetermined speed, a plurality of interconnected refrigerant conducting coil sections respectively mounted adjacent to said openings in spaced apart relation within said housing means for sequential surface exposure to said rapid flow of air sufficient to remove heat from all coil sections, and forced air flow inducing means mounted within said housing means to produce air flow through said coil sections independently of each other for removal of heat during movement of said vehicle below said predetermined speed.

2. The combination of claim 1, wherein said forced air flow inducing means comprises fan means fixedly mounted within said housing means between said coil sections for discharging air in a direction transverse to said one direction of the rapid flow of air to induce flow through one of said openings and the coil section adjacent thereto in a direction opposite to said one direction.

3. In an air conditioning system for an automotive vehicle having a space enclosing structure externally exposed to the free flow of air in response to movement of the vehicle, a refrigerant condensing unit arrangement on said structure for exposure to the air comprising, housing means mounted in sealed relation on said structure having front and rear openings through which a rapid flow of air is conducted in one direction in response to movement of said vehicle above a predetermined speed, a plurality of interconnected refrigerant conducting coil sections respectively mounted adjacent to said openings within said housing means for sequential surface exposure to said rapid flow of air sufficient to remove heat from all coil sections, and forced air flow inducing means mounted within said housing means to produce air flow through said coil sections independently of each other for removal of heat during movement of said vehicle below said predetermined speed, said forced air flow inducing means comprising fan means fixedly mounted within said housing means between said coil sections for discharging air in a direction transverse to said one direction of the rapid flow of air to induce flow through one of said openings and the coil section adjacent thereto in a direction opposite to said one direction, said coil sections including a front coil assembly having flow exposed surfaces disposed perpendicular to said direction of vehicle movement and a rear coil assembly having flow exposed surfaces disposed at a rearwardly inclined angle with respect to the front coil assembly for reduced surface exposure to said rapid flow of air.

4. The combination of claim 3, wherein said housing means comprises a pair of imperforate side walls interconnected by a top wall to define said front opening mounting a screen disposed perpendicular to said direction of vehicle movement and said rear opening mounting a screen inclined downwardly in a rearward directional sense, said top wall mounting upward flow directing discharge openings.

5. In an air conditioning system for an automotive vehicle having a space enclosing structure externally exposed to the free flow of air in response to movement of the vehicle, a refrigerant condensing unit arrangement on said structure for exposure to the air comprising, housing means mounted in sealed relation on said structure having front and rear openings through which a rapid flow of air is conducted in one direction in response to movement of said vehicle above a predetermined speed, a plurality of interconnected refrigerant conducting coil sections respectively adjacent to said openings within said housing means for sequential surface exposure to said rapid flow of air sufficient to remove heat from all coil sections, and forced air flow inducing means mounted within said housing means to produce air flow through said coil sections independently of each other for removal of heat during movement of said vehicle below said predetermined speed, said coil sections including a front coil assembly having flow exposed surfaces disposed perpendicular to said direction of vehicle movement and a rear coil assembly having flow exposed surfaces disposed at a rearwardly inclined angle with respect to the front coil assembly for reduced surface exposure to said rapid flow of air.

6. In an air conditioning system for an automotive vehicle having a space enclosing structure externally exposed to the free flow of air in response to movement of the vehicle, a refrigerant condensing unit arrangement on said structure for exposure to the air comprising, housing means mounted in sealed relation on said structure having front and rear openings through which a rapid flow of air is conducted in one direction in response to movement of said vehicle above a predetermined speed, a plurality of interconnected refrigerant conducting coil sections respectively mounted adjacent to said openings within said housing means for sequential surface exposure to said rapid flow of air sufficient to remove heat from all coil sections, and forced air flow inducing means mounted within said housing means to produce air flow through said coil sections independently of each other for removal of heat during movement of said vehicle below said predetermined speed, said housing means comprising a pair of imperforate side walls interconnected by a top wall to define said front opening mounting a screen disposed perpendicular to said direction of vehicle movement and said rear opening mounting a screen inclined downwardly in a rearward directional sense, said top wall mounting upward flow directing discharge openings.

7. In a motor vehicle air-conditioning system having spaced condenser coil sections, a housing, means for mounting the housing above the vehicle, said housing having imperforate side members and openings defined at opposite ends thereof adjacent to said coil sections, fan means carried within the housing between the condenser coil sections for drawing air external to the housing through both of said openings in opposite directions and through the coil sections for cooling same, a top wall mounted over the condenser coil sections and the fan means increasing air exhaust when the fan means is operative, said housing conducting a flow of air therethrough between said openings in the same direction when the fan means is inoperative.

8. A condenser unit for a vehicle comprising, imperforate housing means mounted on the vehicle for conducting a unidirectional flow of air through openings therein, spaced coil sections mounted respectively adjacent said openings within the housing means having surfaces extending across the flow area of said openings, flow inducing means mounted within said housing means between the coil sections for producing a forced flow of air in different directions respectively through said openings, means mounted on said housing means for exhausting only said forced flow of air, and means for mounting one of the coil sections parallel to the flow area of said openings and the other coil section at an angle to the flow area.

References Cited in the file of this patent

UNITED STATES PATENTS

| | | |
|---|---|---|
| 2,100,834 | Chapman | Nov. 30, 1937 |
| 2,121,115 | Bergdoll | June 21, 1938 |
| 2,218,596 | Ashley | Oct. 22, 1940 |
| 2,443,472 | Mayo et al. | June 15, 1948 |
| 2,895,310 | Benisch | July 21, 1959 |